United States Patent
Oki et al.

(10) Patent No.: US 12,497,303 B2
(45) Date of Patent: Dec. 16, 2025

(54) MOLYBDENUM TRIOXIDE POWDER AND METHOD FOR PRODUCING SAME

(71) Applicant: DIC Corporation, Tokyo (JP)

(72) Inventors: Hironobu Oki, Chiba (JP); Yusuke Kano, Chiba (JP); Jianjun Yuan, Chiba (JP)

(73) Assignee: DIC Corporation, Tokyo (JP)

( * ) Notice: Subject to any disclaimer, the term of this patent is extended or adjusted under 35 U.S.C. 154(b) by 683 days.

(21) Appl. No.: 17/762,726

(22) PCT Filed: Sep. 24, 2020

(86) PCT No.: PCT/JP2020/036025
§ 371 (c)(1),
(2) Date: Mar. 22, 2022

(87) PCT Pub. No.: WO2021/060375
PCT Pub. Date: Apr. 1, 2021

(65) Prior Publication Data
US 2022/0340443 A1    Oct. 27, 2022

(30) Foreign Application Priority Data

Sep. 24, 2019   (JP) ................... 2019-172915

(51) Int. Cl.
*C01G 39/02*        (2006.01)
(52) U.S. Cl.
CPC .......... *C01G 39/02* (2013.01); *C01P 2002/74* (2013.01); *C01P 2006/12* (2013.01)
(58) Field of Classification Search
CPC .................................................... C01G 39/02
See application file for complete search history.

(56) References Cited

U.S. PATENT DOCUMENTS

| 7,829,060 B2 | 11/2010 | Taube et al. |
| 2011/0105790 A1 | 5/2011 | Hagemeyer et al. |
| 2020/0180971 A1 | 6/2020 | Kamei et al. |

FOREIGN PATENT DOCUMENTS

| CN | 110217823 | 9/2019 |
| JP | 2011516378 | 5/2011 |
| WO | 2018003481 | 1/2018 |

OTHER PUBLICATIONS

Hu Sun et al., "Preparation of high purity MoO3 through volatilization of technical-grade Mo calcine in water vapor atmosphere", International Journal of Refractory Metals & Hard Materials, Jul. 2018, pp. 1-7.

"International Search Report (Form PCT/ISA/210) of PCT/JP2020/036025", mailed on Nov. 24, 2020, with English translation thereof, pp. 1-4.

Lu Wang et al., "Preparation of Ultrafine β—MoO3 from Industrial Grade MoO3 Powder by the Method of Sublimation," The Journal of Physical Chemistry C, vol. 120, Aug. 2016, pp. 19821-19829.

*Primary Examiner* — James A Fiorito
(74) *Attorney, Agent, or Firm* — JCIPRNET

(57) ABSTRACT

A molybdenum trioxide powder contains an aggregate of primary particles having a β crystal structure of molybdenum trioxide. The molybdenum trioxide powder has a $MoO_3$ content ratio of 99.6% or more measured by X-ray fluorescence (XRF), and has an average particle diameter of the primary particles of 1 μm or less. A method for producing the above molybdenum trioxide powder includes vaporizing a molybdenum oxide precursor compound to form molybdenum trioxide vapor, and cooling the molybdenum trioxide vapor.

8 Claims, 2 Drawing Sheets

US 12,497,303 B2

MOLYBDENUM TRIOXIDE POWDER AND METHOD FOR PRODUCING SAME

CROSS-REFERENCE TO RELATED APPLICATION

This application is a 371 application of the International PCT application serial no. PCT/JP2020/036025, filed on Sep. 24, 2020, which claims the priority benefits of Japan Patent Application No. 2019-172915, filed on Sep. 24, 2019. The entirety of each of the above-mentioned patent applications is hereby incorporated by reference herein and made a part of this specification.

TECHNICAL FIELD

The present invention relates to a molybdenum trioxide powder and a method for producing the same.

BACKGROUND ART

PTL 1 discloses an apparatus for producing a metal oxide by a flux evaporation method and a method for producing the metal oxide. When a molybdenum compound is used as a flux, molybdenum trioxide is collected in a powder form.

Further, PTL 2 discloses a method for producing a nanocrystalline molybdenum mixed oxide and use of the molybdenum mixed oxide as a catalyst for chemical conversion.

CITATION LIST

Patent Literature

PTL 1: WO 2018/003481
PTL 2: JP-T-2011-516378

SUMMARY OF INVENTION

Technical Problem

When a molybdenum trioxide powder is used as a precursor of molybdenum sulfide, commercially available molybdenum trioxide powders have an α crystal structure and are hardly sulfurized. In addition, when the purity of molybdenum trioxide is high, molybdenum sulfide having high purity can be obtained, and when the purity is low, a sulfide derived from impurities may be generated. Generally, sulfides other than molybdenum sulfide have poor stability and are easily decomposed by acids, water, or the like to generate highly toxic hydrogen sulfide. Therefore, from the viewpoint of storage stability (generation of hydrogen sulfide), the purity is required to be extremely high.

Accordingly, an object of the invention is to provide a molybdenum trioxide powder suitable as a precursor of molybdenum sulfide, and a method for producing the same.

Solution to Problem

The invention includes the following aspects.
[1] A molybdenum trioxide powder containing: an aggregate of primary particles having a β crystal structure of molybdenum trioxide, wherein the molybdenum trioxide powder has a $MoO_3$ content ratio of 99.6% or more measured by X-ray fluorescence (XRF), and has an average particle diameter of the primary particles of 1 μm or less.
[2] The molybdenum trioxide powder according to the above [1], wherein in a spectrum obtained from powder X-ray diffraction (XRD) using Cu-Kα rays as an X-ray source, a ratio (β (011)/α (021)) of intensity of a peak attributed to a (011) plane of a β crystal of $MoO_3$ to intensity of a peak attributed to a (021) plane of an α crystal of $MoO_3$ is 0.1 or more.
[3] The molybdenum trioxide powder according to the above [1] or [2], wherein the molybdenum trioxide powder has a specific surface area of 10 $m^2$/g to 100 $m^2$/g measured by a BET method.
[4] The molybdenum trioxide powder according to any one of the above [1] to [3], wherein in a radial distribution function obtained from an extended X-ray absorption fine structure (EXAFS) spectrum of a K absorption edge of molybdenum, a ratio (I/II) of intensity I of a peak caused by Mo—O to intensity II of a peak caused by Mo—Mo is more than 1.1.
[5] A method for producing the molybdenum trioxide powder according to any one of the above [1] to [4], including: vaporizing a molybdenum oxide precursor compound to form molybdenum trioxide vapor; and cooling the molybdenum trioxide vapor.
[6] The method for producing a molybdenum trioxide powder according to the above [5], wherein a raw material mixture containing the molybdenum oxide precursor compound and a metal compound other than the molybdenum oxide precursor compound is calcined to vaporize the molybdenum oxide precursor compound so as to form molybdenum trioxide vapor, and a ratio of the metal compound to 100% by mass of the raw material mixture is 70% by mass or less in terms of oxide.
[7] The method for producing a molybdenum trioxide powder according to the above [5] or [6], wherein the molybdenum trioxide vapor is cooled in an air atmosphere.
[8] The method for producing a molybdenum trioxide powder according to any one of the above [5] to [7], wherein a powder obtained by cooling the molybdenum trioxide vapor is calcined again at a temperature of 100° C. to 320° C.

Advantageous Effects of Invention

The molybdenum trioxide powder according to the invention is suitable as a precursor of molybdenum sulfide.

DESCRIPTION OF EMBODIMENTS

<Molybdenum Trioxide Powder>

Figure 1:
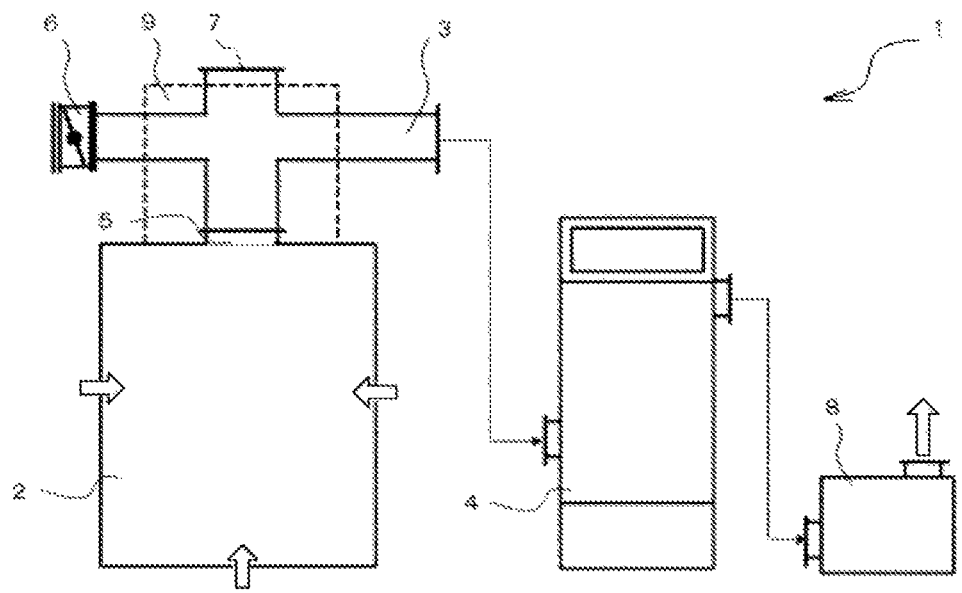
FIG. 1 is a schematic view of an example of an apparatus used for producing a molybdenum trioxide powder according to one embodiment of the invention.

A molybdenum trioxide powder according to one embodiment contains an aggregate of primary particles having a β crystal structure of molybdenum trioxide. The molybdenum trioxide powder has a $MoO_3$ content ratio of 99.6% or more measured by X-ray fluorescence (XRF), and has an average particle diameter of the primary particles of 1 μm or less.

Since the molybdenum trioxide powder according to the present embodiment contains an aggregate of primary particles, which have an average particle diameter of 1 μm or less and have a β crystal structure of molybdenum trioxide, the molybdenum trioxide powder has better reactivity with sulfur than molybdenum trioxide powders having only an α crystal as a crystal structure in the related art. Further, since the molybdenum trioxide powder according to the present embodiment has a $MoO_3$ content ratio of 99.6% or more measured by X-ray fluorescence (XRF), when the molybdenum trioxide powder is subjected to sulfurization reaction, it is possible to obtain molybdenum sulfide having high purity and good storage stability, which is not likely to generate sulfides derived from impurities. Therefore, the molybdenum trioxide powder according to the present embodiment can be suitably used as a precursor of molybdenum sulfide.

The reactivity of the molybdenum trioxide powder with sulfur can be evaluated by, for example, mixing 1.00 g of the molybdenum trioxide powder to be evaluated and 1.57 g of sulfur to each other, calcining the mixture at 320° C. for 4 hours in a nitrogen atmosphere, and determining a conversion rate of the obtained black powder to $MoS_2$.

The conversion rate to $MoS_2$ can be determined by a reference intensity ratio (RIR) method based on spectral data obtained by measuring the black powder with X-ray diffraction (XRD). A conversion rate $R_C$ to $MoS_2$ can be determined according to the following equation (1) using an RIR value $K_A$ of molybdenum sulfide ($MoS_2$), integrated intensity $I_A$ of a peak in the vicinity of $2\theta=14.4°\pm0.5°$ attributed to the (002) plane or the (003) plane of molybdenum sulfide ($MoS_2$), an RIR value $K_B$ of each molybdenum oxide ($MoO_3$ as a raw material, and $Mo_9O_{25}$, $Mo_4O_{11}$, $MoO_2$, etc. as reaction intermediates), and integrated intensity $I_B$ of the strongest line peak of each molybdenum oxide ($MoO_3$ as a raw material, and $Mo_9O_{25}$, $Mo_4O_{11}$, $MoO_2$, etc. as reaction intermediates).

$$R_C(\%)=(I_A/K_A)/(\Sigma(I_B/K_B))\times 100 \quad (1)$$

Here, values described in the ICSD database can be used as the RIR values, and integrated X-ray powder diffraction software (PDXL) (Rigaku Corporation) can be used for analysis.

The average particle diameter of the primary particles of the molybdenum trioxide powder according to the present embodiment is 1 μm or less, and is preferably 600 nm or less, more preferably 400 nm or less, and particularly preferably 200 nm or less, from the viewpoints of a large surface area and the reactivity with sulfur. The average particle diameter of the primary particles of the molybdenum trioxide powder according to the present embodiment may be 10 nm or more, 20 nm or more, or 40 nm or more.

The average particle diameter of the primary particles of the molybdenum trioxide powder refers to an average value of primary particle diameters of 50 primary particles randomly selected when the molybdenum trioxide powder is photographed with a scanning electron microscope (SEM), the major axis (the Feret diameter of the longest portion observed) and the minor axis (the short Feret diameter in a direction perpendicular to the Feret diameter of the longest portion) of the minimum unit particles (that is, the primary particles) constituting aggregates on a two-dimensional image are measured, and an average value is defined as a primary particle diameter.

The molybdenum trioxide powder according to the present embodiment has a $MoO_3$ content ratio of 99.6% to 100.0% measured by X-ray fluorescence (XRF) with respect to the total detected peak intensity.

The molybdenum trioxide powder according to the present embodiment contains an aggregate of primary particles having a β crystal structure of molybdenum trioxide. The β crystal structure can be observed by the presence of a peak (in the vicinity of 2θ: 23.01°, No. 86426 (inorganic crystal structure database, ICSD)) attributed to the (011) plane of a β crystal of $MoO_3$ in a spectrum obtained by powder X-ray diffraction (XRD) using Cu-Kα rays as an X-ray source. An α crystal structure of molybdenum trioxide can be observed by the presence of a peak of the (021) plane (in the vicinity of 2θ: 27.32°, No. 166363 (inorganic crystal structure database, ICSD)) of an α crystal of $MoO_3$.

The molybdenum trioxide powder according to the present embodiment preferably has a ratio (β (011)/α (021)) of the intensity of a peak attributed to the (011) plane of the β crystal of $MoO_3$ to the intensity of a peak attributed to the (021) plane of the α crystal of $MoO_3$ of 0.1 or more in the spectrum obtained by powder X-ray diffraction (XRD) using Cu-Kα rays as an X-ray source.

As for the intensity of the peak attributed to the (011) plane of the β crystal of $MoO_3$ and the intensity of the peak attributed to the (021) plane of the α crystal of $MoO_3$, each maximum peak intensity is read to determine the ratio (β (011)/α (021)).

In the molybdenum trioxide powder according to the present embodiment, the ratio (β (011)/α (021)) is preferably 0.1 to 10.0, more preferably 0.2 to 10.0, and particularly preferably 0.4 to 10.0.

The molybdenum trioxide powder according to the present embodiment preferably has a specific surface area of 10 $m^2/g$ to 100 $m^2/g$ measured by a BET method.

In the molybdenum trioxide powder according to the present embodiment, the specific surface area is preferably 10 $m^2/g$ or more, more preferably 20 $m^2/g$ or more, and still more preferably 30 $m^2/g$ or more from the viewpoint of good reactivity with sulfur. In the molybdenum trioxide powder according to the present embodiment, the specific surface area is preferably 100 $m^2/g$ or less and may be 90 $m^2/g$ or less or 80 $m^2/g$ or less from the viewpoint of facilitation in production.

In the molybdenum trioxide powder according to the present embodiment, in a radial distribution function obtained from an extended X-ray absorption fine structure (EXAFS) spectrum of a K absorption edge of molybdenum, a ratio (I/II) of intensity I of a peak caused by Mo—O to intensity II of a peak caused by Mo—Mo is preferably more than 1.1.

As for the intensity I of the peak caused by Mo—O and the intensity II of the peak caused by Mo—Mo, each maximum peak intensity is read to determine the ratio (I/II). The ratio (I/II) is considered to indicate that the β crystal of $MoO_3$ is obtained in the molybdenum trioxide powder, and the greater the ratio (I/II), the better the reactivity with sulfur.

In the molybdenum trioxide powder according to the present embodiment, the ratio (I/II) is preferably 1.1 to 5.0, and may be 1.2 to 4.0 or 1.2 to 3.0.

<Method for Producing Molybdenum Trioxide Powder>

A method for producing a molybdenum trioxide powder according to the present embodiment is a method for producing the molybdenum trioxide powder according to the above-described embodiment, and includes vaporizing a molybdenum oxide precursor compound to form molybdenum trioxide vapor, and cooling the molybdenum trioxide vapor.

The method for producing a molybdenum trioxide powder according to the present embodiment includes calcining a raw material mixture containing a molybdenum oxide precursor compound and a metal compound other than the molybdenum oxide precursor compound to vaporize the molybdenum oxide precursor compound so as to form molybdenum trioxide vapor. The ratio of the metal compound to 100% by mass of the raw material mixture is preferably 70% by mass or less in terms of oxide.

The method for producing a molybdenum trioxide powder according to the present embodiment can be suitably carried out by using a production apparatus 1 shown in FIG. 1.

FIG. 1 is a schematic view of an example of an apparatus used for producing the molybdenum trioxide powder according to the present embodiment. The production apparatus 1 includes a calcining furnace 2 for calcining a molybdenum oxide precursor compound or the raw material mixture to vaporize the molybdenum oxide precursor compound, a cross-shaped cooling pipe 3 connected to the calcining furnace 2 for powdering the molybdenum trioxide vapor vaporized by the calcining, and a collection device 4 as a collection unit for collecting the molybdenum trioxide powder aggregated in a powder form in the cooling pipe 3. At this time, the calcining furnace 2 and the cooling pipe 3 are connected to each other via a discharge port 5. Further, in the cooling pipe 3, an opening degree adjustment damper 6 is disposed at an outside air intake port (not shown) at a left end portion, and an observation window 7 is disposed at an upper end portion. An air exhauster 8, which is a first air blowing unit, is connected to the collection device 4. When the air exhauster 8 exhausts air, the collection device 4 and the cooling pipe 3 suction the air, and the outside air is blown into the cooling pipe 3 from the opening degree adjustment damper 6 of the cooling pipe 3. That is, the air exhauster 8 passively blows air to the cooling pipe 3 by exhibiting a suction function. The production apparatus 1 may include an external cooling device 9, which makes it possible to freely control cooling conditions for the molybdenum trioxide vapor generated from the calcining furnace 2.

The opening degree adjustment damper 6 takes in air from the outside air intake port and the molybdenum trioxide vapor vaporized in the calcining furnace 2 is cooled in an air atmosphere to obtain a molybdenum trioxide powder, whereby the ratio (I/II) can be made more than 1.1, and the β crystal of $MoO_3$ can be easily obtained in the molybdenum trioxide powder. In contrast, when the molybdenum trioxide vapor is cooled in a state where an oxygen concentration in a nitrogen atmosphere is low, for example, when the molybdenum trioxide vapor is cooled using liquid nitrogen, the oxygen defect density is likely to increase and the ratio (I/II) is likely to decrease.

The molybdenum oxide precursor compound is not particularly limited as long as it is a precursor compound for forming the molybdenum trioxide powder according to the invention.

The molybdenum oxide precursor compound is not particularly limited as long as it forms molybdenum trioxide vapor by being calcined, and examples thereof include metal molybdenum, molybdenum trioxide, molybdenum dioxide, molybdenum sulfide, ammonium molybdate, phosphomolybdic acid ($H_3PMo_{12}O_{40}$), silicomolybdic acid ($H_4SiMo_{12}O_{40}$), aluminum molybdate, silicon molybdate, magnesium molybdate ($MgMo_nO_{3n+1}$ (n=1 to 3)), sodium molybdate ($Na_2Mo_nO_{3n+1}$ (n=1 to 3)), titanium molybdate, ferric molybdate, potassium molybdate ($K_2Mo_nO_{3n+1}$ (n=1 to 3)), zinc molybdate, boron molybdate, lithium molybdate ($Li_2Mo_nO_{3n+1}$ (n=1 to 3)), cobalt molybdate, nickel molybdate, manganese molybdate, chromium molybdate, cesium molybdate, barium molybdate, strontium molybdate, yttrium molybdate, zirconium molybdate, and copper molybdate. These molybdenum oxide precursor compounds may be used alone or in combination of two or more thereof. The form of the molybdenum oxide precursor compound is not particularly limited, and for example, the molybdenum oxide precursor compound may be in a powder form such as molybdenum trioxide, or may be in a liquid form such as an aqueous solution of ammonium molybdate. The molybdenum oxide precursor compound is preferably in the form of a powder having good handling properties and good energy efficiency.

As the molybdenum oxide precursor compound, commercially available α-crystal molybdenum trioxide is preferably used. Further, when ammonium molybdate is used as the molybdenum oxide precursor compound, ammonium molybdate is converted by calcining into molybdenum trioxide that is thermodynamically stable, and thus the molybdenum oxide precursor compound to be vaporized becomes molybdenum trioxide.

Among these molybdenum oxide precursor compounds, molybdenum trioxide is preferably contained from the viewpoint of easily controlling the purity of the obtained molybdenum trioxide powder, the average particle diameter of the primary particles, and the crystal structure.

The molybdenum trioxide vapor can also be formed by calcining a raw material mixture containing a molybdenum oxide precursor compound and a metal compound other than the molybdenum oxide precursor compound.

The metal compound other than the molybdenum oxide precursor compound is not particularly limited, and examples thereof include an aluminum compound, a silicon compound, a titanium compound, a magnesium compound, a sodium compound, a potassium compound, a zirconium compound, an yttrium compound, a zinc compound, a copper compound, and an iron compound. Among these, it is preferable to use an aluminum compound, a silicon compound, a titanium compound, or a magnesium compound.

The molybdenum oxide precursor compound and the metal compound other than the molybdenum oxide precursor compound may form an intermediate, but even in this case, the intermediate is decomposed by calcining, and molybdenum trioxide can be vaporized in a thermodynamically stable form.

Among the compounds used as the metal compound other than the molybdenum oxide precursor compound, an aluminum compound is preferably used to prevent damage to a calcining furnace, and the metal compound other than the molybdenum oxide precursor compound may not be used to improve the purity of the molybdenum trioxide powder.

Examples of the aluminum compound include aluminum chloride, aluminum sulfate, basic aluminum acetate, aluminum hydroxide, boehmite, pseudo-boehmite, transition aluminum oxides (γ-aluminum oxide, δ-aluminum oxide, θ-aluminum oxide, etc.), α-aluminum oxide, and a mixed aluminum oxide having two or more crystal phases.

When a raw material mixture containing a molybdenum oxide precursor compound and a metal compound other than the molybdenum oxide precursor compound is calcined, the molybdenum oxide precursor compound preferably has a content ratio of 40% by mass to 100% by mass with respect to 100% by mass of the raw material mixture, and the content ratio may be 45% by mass to 100% by mass or 50% by mass to 100% by mass.

The calcining temperature varies depending on the molybdenum oxide precursor compound, the metal compound, and the like to be used, and the desired molybdenum trioxide powder, and is usually preferably a temperature at which the intermediate can be decomposed. For example, since aluminum molybdate can be formed as an intermediate when a molybdenum compound is used as the molybdenum oxide precursor compound and an aluminum compound is used as the metal compound, the calcining temperature is preferably 500° C. to 1,500° C., more preferably 600° C. to 1,550° C., and still more preferably 700° C. to 1,600° C.

The calcining time is not particularly limited, and may be, for example, 1 minute to 30 hours, 10 minutes to 25 hours, or 100 minutes to 20 hours.

The temperature rising rate varies depending on the molybdenum oxide precursor compound and the metal compound to be used, and the properties of the desired molybdenum trioxide powder, and is preferably 0.1° C./min to 100° C./min, more preferably 1° C./min to 50° C./min, and still more preferably 2° C./min to 10° C./min from the viewpoint of production efficiency.

The internal pressure in the calcining furnace is not particularly limited, and may be a positive pressure or a reduced pressure, but from the viewpoint of suitably discharging the molybdenum oxide precursor compound from the calcining furnace to the cooling pipe, the calcining is preferably performed under a reduced pressure. Specifically, the degree of pressure reduction is preferably −5,000 Pa to −10 Pa, more preferably −2,000 Pa to −20 Pa, and still more preferably −1,000 Pa to −50 Pa. When the degree of pressure reduction is −5,000 Pa or more, high airtightness and mechanical strength of the calcining furnace are not excessively required, and production costs can be reduced, which is preferable. In contrast, when the degree of pressure reduction is −10 Pa or less, clogging of the molybdenum oxide precursor compound at a discharge port of the calcining furnace can be prevented, which is preferable.

When a gas is blown into the calcining furnace during calcining, the temperature of the blown gas is preferably has 5° C. to 500° C., and more preferably 10° C. to 100° C.

Further, the blowing speed of the gas is preferably 1 L/min to 500 L/min, and more preferably 10 L/min to 200 L/min with respect to 100 L of an effective volume of the calcining furnace.

The temperature of the vaporized molybdenum trioxide vapor varies depending on the type of the molybdenum oxide precursor compound to be used, and is preferably 200° C. to 2,000° C., and more preferably 400° C. to 1,500° C. When the temperature of the vaporized molybdenum trioxide vapor is 2,000° C. or lower, usually, the vapor tends to be easily turned into a powder by blowing outside air (0° C. to 100° C.) to the cooling pipe.

The discharge rate of the molybdenum trioxide vapor discharged from the calcining furnace can be controlled based on the amount of the molybdenum oxide precursor compound to be used, the amount of the metal compound to be used, the temperature of the calcining furnace, blowing of the gas into the calcining furnace, and the diameter of the discharge port of the calcining furnace. The discharge rate also varies depending on the cooling capacity of the cooling pipe, and the discharge rate of the molybdenum trioxide vapor discharged from the calcining furnace to the cooling pipe is preferably 0.001 g/min to 100 g/min, and more preferably 0.1 g/min to 50 g/min.

Further, the content of the molybdenum trioxide vapor contained in the gas discharged from the calcining furnace is preferably 0.01 mg/L to 1,000 mg/L, and more preferably 1 mg/L to 500 mg/L.

Next, the molybdenum trioxide vapor is cooled to form a powder.

The molybdenum trioxide vapor is cooled by lowering the temperature of the cooling pipe. In this case, examples of a cooling method include cooling by blowing a gas into the cooling pipe as described above, cooling by a cooling mechanism included in the cooling pipe, and cooling by an external cooling device.

The molybdenum trioxide vapor is preferably cooled in an air atmosphere. When molybdenum trioxide vapor is cooled in an air atmosphere to form a molybdenum trioxide powder, the ratio (I/II) can be made more than 1.1, and the β crystal of $MoO_3$ can be easily obtained in the molybdenum trioxide powder.

The cooling temperature (temperature of the cooling pipe) is not particularly limited, and is preferably −100° C. to 600° C., and more preferably −50° C. to 400° C.

The cooling rate of the molybdenum trioxide vapor is not particularly limited, and is preferably 100° C./s to 100,000° C./s, and more preferably 1,000° C./s to 50,000° C./s. As the cooling rate of the molybdenum trioxide vapor increases, a molybdenum trioxide powder having a small particle diameter and a large specific surface area tends to be obtained.

When the cooling method is cooling by blowing a gas into the cooling pipe, the temperature of the blown gas is preferably −100° C. to 300° C., and more preferably −50° C. to 100° C.

Further, the blowing speed of the gas is preferably 0.1 m³/min to 20 m³/min, and more preferably 1 m³/min to 10 m³/min. When the blowing speed of the gas is 0.1 m³/min or more, a high cooling rate can be achieved, and clogging in the cooling pipe can be prevented, which is preferable. In contrast, when the blowing speed of the gas is 20 m³/min or less, the first air blowing unit (such as an air exhauster) which is expensive is no longer needed, and production costs can be reduced, which is preferable.

The powder obtained by cooling the molybdenum trioxide vapor is transported to the collection device for collection.

In the method for producing a molybdenum trioxide powder according to the present embodiment, the powder obtained by cooling the molybdenum trioxide vapor may be calcined again at a temperature of 100° C. to 320° C.

That is, the molybdenum trioxide powder obtained by the method for producing a molybdenum trioxide powder according to the present embodiment may be calcined again at a temperature of 100° C. to 320° C. The calcining temperature in the re-calcining may be 120° C. to 280° C. or 140° C. to 240° C. The calcining time in the re-calcining may be, for example, 1 minute to 4 hours, 10 minutes to 5 hours, or 100 minutes to 6 hours. However, a part of the β crystal structure of molybdenum trioxide disappears due to re-calcining, and when calcining is performed at a temperature of 350° C. or higher for 4 hours, the β crystal structure of the molybdenum trioxide powder disappears, the ratio (β (011)/α (021)) is 0, and the reactivity with sulfur is impaired.

EXAMPLES

Next, the invention will be described in more detail with reference to Examples, but the invention is not limited to the following Examples.

[Method for Measuring Average Particle Diameter of Primary Particles of Molybdenum Trioxide Powder]

A molybdenum trioxide powder was photographed with a scanning electron microscope (SEM). The major axis (the Feret diameter of the longest portion observed) and the minor axis (the short Feret diameter in a direction perpendicular to the Feret diameter of the longest portion) of the minimum unit particles (that is, primary particles) constituting aggregates on a two-dimensional image were measured, and an average value thereof was defined as the primary particle diameter. The same operation was performed on 50 primary particles randomly selected, and the average particle diameter of the primary particles was calculated based on the average value of the primary particle diameters of these primary particles.

[Purity Measurement of Molybdenum Trioxide: XRF Analysis]

About 70 mg of a sample of the collected molybdenum trioxide powder was taken on a filter paper and covered with a PP film, and the composition of the molybdenum trioxide powder was analyzed using an X-ray fluorescence analyzer Primus IV (manufactured by Rigaku Corporation). The amount of molybdenum determined based on an XRF analysis result was determined in terms of molybdenum trioxide (% by mass) with respect to 100% by mass of the molybdenum trioxide powder.

[Crystal Structure Analysis: XRD Method]

A sample of the collected molybdenum trioxide powder or a sulfide thereof was placed and filled in a holder for a measurement sample having a depth of 0.5 mm so as to be flat with a constant load, set in a wide-angle X-ray diffraction (XRD) apparatus (Ultima IV manufactured by Rigaku Corporation), and was subjected to measurement under Cu/Kα rays, 40 kV/40 mA, a scanning speed of 2°/min, and a scanning range of 10°<2θ<70°.

The β crystal structure of molybdenum trioxide was observed by the presence of a peak of No. 86426 (inorganic crystal structure database, ICSD) in the vicinity of 2θ: 23.01° attributed to the (011) plane of the β crystal of $MoO_3$ in a spectrum of powder X-ray diffraction (XRD) measured under these conditions.

Further, the α crystal structure of molybdenum trioxide was observed by the presence of a peak of the (021) plane (in the vicinity of 2θ: 27.32°, No. 166363 (inorganic crystal structure database, ICSD)) of the α crystal of $MoO_3$.

[Conversion Rate $R_C$ to $MoS_2$]

1.00 g of the molybdenum trioxide powder to be evaluated and 1.57 g of sulfur were mixed to each other and calcined in a nitrogen atmosphere at 320° C. for 4 hours, and the obtained black powder was measured by X-ray diffraction (XRD). Next, by the reference intensity ratio (RIR) method, the conversion rate $R_C$ to $MoS_2$ was determined according to the following equation (1) using the RIR value $K_A$ of molybdenum sulfide ($MoS_2$), the integrated intensity $I_A$ of the peak in the vicinity of 2θ=14.4°±0.5° attributed to the (002) plane or the (003) plane of molybdenum sulfide ($MoS_2$), the RIR value $K_B$ of each molybdenum oxide ($MoO_3$ as a raw material, and $Mo_9O_{25}$, $Mo_4O_{11}$, $MoO_2$, etc. as reaction intermediates), and the integrated intensity $I_B$ of the strongest line peak of each molybdenum oxide ($MoO_3$ as a raw material, and $Mo_9O_{25}$, $Mo_4O_{11}$, $MoO_2$, etc. as reaction intermediates).

$$R_C(\%)=(I_A/K_A)/(\Sigma(I_B/K_B))\times 100 \quad (1)$$

Here, values described in the ICSD database were used as the RIR values, and integrated X-ray powder diffraction software (PDXL) (Rigaku Corporation) was used for analysis.

[Measurement of Specific Surface Area: BET Method]

The sample of the collected molybdenum trioxide powder was measured with a specific surface area meter (BELSORP-mini, manufactured by MicrotracBEL Corporation). The surface area per gram of the sample measured based on the amount of the adsorbed nitrogen gas by the BET method was calculated as the specific surface area ($m^2/g$).

[Measurement of Extended X-Ray Absorption Fine Structure (EXAFS)]

32.76 mg of the collected molybdenum trioxide powder and 333.0 mg of boron nitride were mixed with each other in a mortar. 121.92 mg of the mixture was weighed and compression molded into a tablet having a diameter of 8 mm to obtain a measurement sample. Using the measurement sample, the extended X-ray absorption fine structure (EXAFS) was measured by a transmission method with BL5S1 of Aichi Synchrotron Radiation Center. Athena (Internet <URL: https://bruceravel.github.io/demeter/>) was used for the analysis.

Example 1

1 kg of a transition aluminum oxide (activated alumina manufactured by Wako Pure Chemical Industries, Ltd., average particle diameter: 45 μm) and 1 kg of molybdenum trioxide (manufactured by TAIYO KOKO Co., Ltd.) were mixed with each other, and the mixture was then charged into a sagger and calcined at a temperature of 1,100° C. for 10 hours in the calcining furnace 2 of the production apparatus 1 shown in FIG. 1. During the calcining, outside air (blowing speed: 50 L/min, outside air temperature: 25° C.) was introduced from a side surface and a lower surface of the calcining furnace 2. Molybdenum trioxide was evaporated in the calcining furnace 2 and then cooled in an air atmosphere in the vicinity of the collection device 4 and precipitated as particles. An RHK simulator (manufactured by Noritake Co., Ltd., effective volume: 115 L) was used as the calcining furnace 2, and a VF-5N dust collector (manufactured by AMANO Corporation) was used as the collection device 4.

After calcining, 1.0 kg of aluminum oxide, a blue powder, and 0.85 kg of the molybdenum trioxide powder collected by the collection device 4 were taken out from the sagger. The collected molybdenum trioxide powder of Example 1 had an average particle diameter of primary particles of 80 nm, and by X-ray fluorescence (XRF) measurement, it was found that the content ratio (purity) of molybdenum trioxide ($MoO_3$) was 99.7%.

Figure 2:
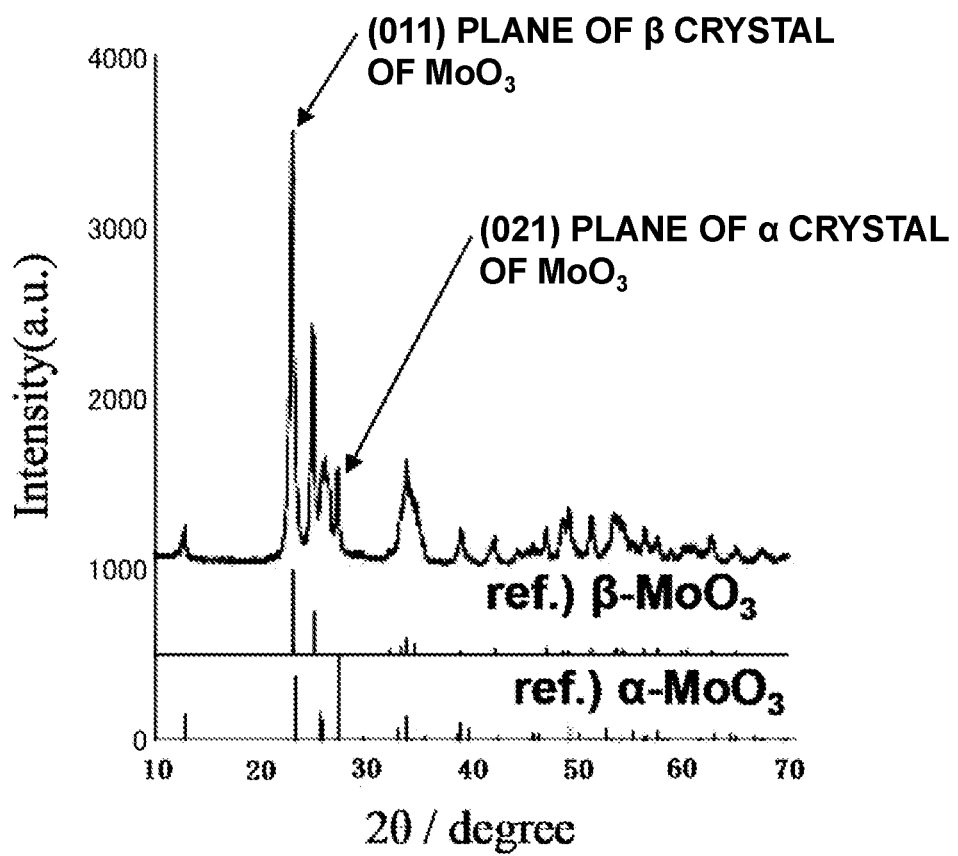
FIG. 2 shows a result of an X-ray diffraction (XRD) pattern of the molybdenum trioxide powder according to the embodiment of the invention together with a standard pattern (α-$MoO_3$) of an α crystal and a standard pattern (β-$MoO_3$) of a β crystal of molybdenum trioxide.

Further, X-ray diffraction (XRD) of the molybdenum trioxide powder of Example 1 was measured. The result of an X-ray diffraction pattern is shown in FIG. 2 together with a standard pattern (α-$MoO_3$) of the α crystal and a standard pattern (β-$MoO_3$) of the β crystal of molybdenum trioxide. A peak attributed to the α crystal of $MoO_3$ and a peak attributed to the β crystal of $MoO_3$ were observed, and no other peaks were observed. The peak intensity ratio (β (011)/α (021)) of the (011) plane of the β crystal of $MoO_3$ to the (021) plane of the α crystal of $MoO_3$ was determined, and β (011)/α (021) was 5.2.

In a porcelain crucible, 1.00 g of the molybdenum trioxide powder of Example 1 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 98%, and the reaction with sulfur proceeded rapidly.

The specific surface area (SA) of the molybdenum trioxide powder of Example 1 measured by the BET method was 44.0 $m^2/g$.

Figure 4:
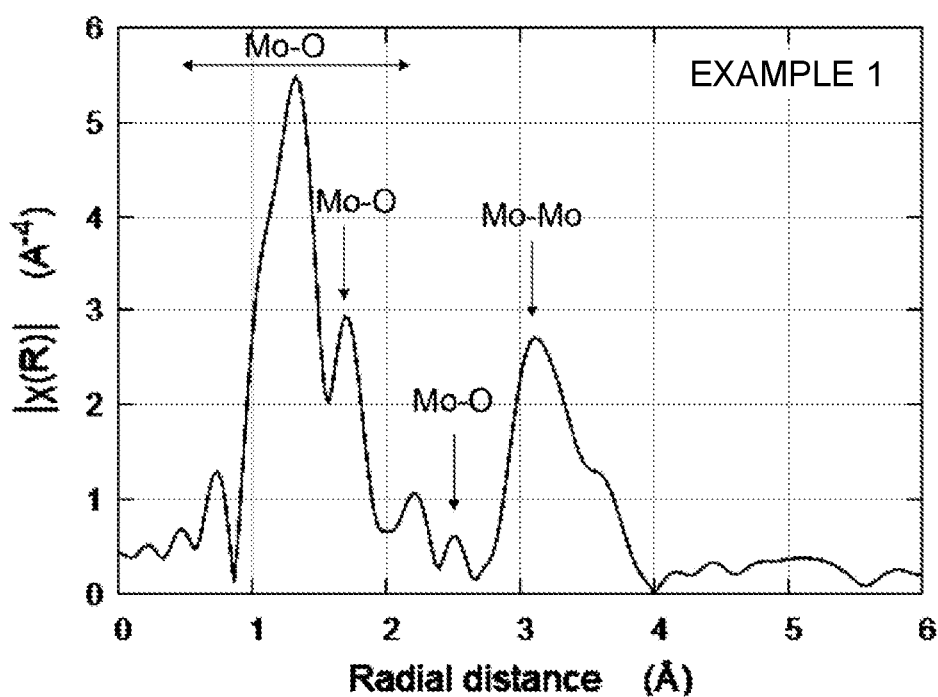
FIG. 4 is an extended X-ray absorption fine structure (EXAFS) spectrum of a K absorption edge of molybdenum measured using the molybdenum trioxide powder according to the embodiment of the invention.

The extended X-ray absorption fine structure (EXAFS) was measured using the molybdenum trioxide powder of Example 1. FIG. 4 shows an extended X-ray absorption fine structure (EXAFS) spectrum of a K absorption edge of molybdenum. In a radial distribution function obtained from the spectrum, the ratio (I/II) of the intensity I of a peak caused by Mo—O to the intensity II of a peak caused by Mo—Mo was 2.0.

Example 2

A molybdenum trioxide powder was produced in the same manner as in Example 1 except that the calcining temperature of 1,100° C. in Example 1 was changed to 950° C.

After calcining, 1.0 kg of aluminum oxide, a blue powder, and 0.8 kg of the molybdenum trioxide powder collected by the collection device 4 were taken out from the sagger. The collected molybdenum trioxide powder of Example 2 had an average particle diameter of primary particles of 130 nm, and by X-ray fluorescence (XRF) measurement, it was found that the content ratio (purity) of molybdenum trioxide ($MoO_3$) was 99.8%.

Further, the molybdenum trioxide powder of Example 2 was subjected to crystal structure analysis by X-ray diffraction (XRD), and as a result, the peak attributed to the β crystal of $MoO_3$ and the peak attributed to the α crystal of $MoO_3$ were observed, and no other peaks were observed. Next, the peak intensity ratio (β (011)/α (021)) of the (011) plane of the β crystal to the (021) plane of the α crystal was determined, and β (011)/α (021) was 4.4.

In a porcelain crucible, 1.00 g of the molybdenum trioxide powder of Example 2 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 97%, and the reaction with sulfur proceeded rapidly.

Example 3

A molybdenum trioxide powder was produced in the same manner as in Example 1 except that the calcining temperature of 1,100° C. in Example 1 was changed to 1,500° C.

After calcining, 1.0 kg of aluminum oxide, a blue powder, and 0.95 kg of the molybdenum trioxide powder collected by the collection device 4 were taken out from the sagger. The collected molybdenum trioxide powder of Example 3 had an average particle diameter of primary particles of 120 nm, and by X-ray fluorescence (XRF) measurement, it was found that the content ratio (purity) of molybdenum trioxide ($MoO_3$) was 99.6%.

Further, the molybdenum trioxide powder of Example 3 was subjected to crystal structure analysis by X-ray diffraction (XRD), and as a result, the peak attributed to the β crystal of $MoO_3$ and the peak attributed to the α crystal of $MoO_3$ were observed, and no other peaks were observed. Next, the peak intensity ratio (β (011)/α (021)) of the (011) plane of the β crystal to the (021) plane of the α crystal was determined, and β (011)/α (021) was 6.2.

In a porcelain crucible, 1.00 g of the molybdenum trioxide powder of Example 3 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 99%, and the reaction with sulfur proceeded rapidly.

Example 4

1 g of the molybdenum trioxide powder of Example 1 was charged into a crucible and calcined again at 200° C. for 4 hours to obtain a molybdenum trioxide powder of Example 4.

The molybdenum trioxide powder of Example 4 had an average particle diameter of primary particles of 80 nm, and by X-ray fluorescence (XRF) measurement, it was found that the content ratio (purity) of molybdenum trioxide ($MoO_3$) was 99.7%.

Further, the molybdenum trioxide powder of Example 4 was subjected to crystal structure analysis by X-ray diffraction (XRD), and as a result, the peak attributed to the β crystal of $MoO_3$ and the peak attributed to the α crystal of $MoO_3$ were observed, and no other peaks were observed. Next, the peak intensity ratio (β (011)/α (021)) of the (011) plane of the β crystal to the (021) plane of the α crystal was determined, and β (011)/α (021) was 2.0.

In a porcelain crucible, 1.00 g of the molybdenum trioxide powder of Example 4 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 96%, and the reaction with sulfur proceeded rapidly.

Example 5

1 g of the molybdenum trioxide powder of Example 1 was charged into a crucible and calcined again at 300° C. for 4 hours to obtain a molybdenum trioxide powder of Example 5.

The molybdenum trioxide powder of Example 5 had an average particle diameter of primary particles of 130 nm, and by X-ray fluorescence (XRF) measurement, it was found that the content ratio (purity) of molybdenum trioxide ($MoO_3$) was 99.7%.

Further, the molybdenum trioxide powder of Example 5 was subjected to crystal structure analysis by X-ray diffraction (XRD), and as a result, the peak attributed to the β crystal of $MoO_3$ and the peak attributed to the α crystal of $MoO_3$ were observed, and no other peaks were observed. Next, the peak intensity ratio (β (011)/α (021)) of the (011) plane of the β crystal to the (021) plane of the α crystal was determined, and β (011)/α (021) was 1.7.

In a porcelain crucible, 1.00 g of the molybdenum trioxide powder of Example 5 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 95%, and the reaction with sulfur proceeded rapidly.

Example 6

A molybdenum trioxide powder was produced in the same manner as in Example 1 except that the mixture of 1 kg of a transition aluminum oxide (activated alumina manufactured by Wako Pure Chemical Industries, Ltd., average particle diameter: 45 μm) and 1 kg of molybdenum trioxide (manufactured by TAIYO KOKO Co., Ltd.) in Example 1 was changed to a mixture of 0.5 kg of a transition aluminum oxide (activated alumina manufactured by Wako Pure Chemical Industries, Ltd., average particle diameter: 45 μm) and 1 kg of molybdenum trioxide (manufactured by TAIYO KOKO Co., Ltd.).

After calcining, 1.0 kg of aluminum oxide, a blue powder, and 0.87 kg of the molybdenum trioxide powder collected by the collection device 4 were taken out from the sagger. The collected molybdenum trioxide powder of Example 6 had an average particle diameter of primary particles of 120 nm, and by X-ray fluorescence (XRF) measurement, it was found that the content ratio (purity) of molybdenum trioxide ($MoO_3$) was 99.9%.

Further, the molybdenum trioxide powder of Example 6 was subjected to crystal structure analysis by X-ray diffraction (XRD), and as a result, the peak attributed to the β crystal of $MoO_3$ and the peak attributed to the α crystal of $MoO_3$ were observed, and no other peaks were observed. Next, the peak intensity ratio (β (011)/α (021)) of the (011) plane of the β crystal to the (021) plane of the α crystal was determined, and β (011)/α (021) was 4.5.

In a porcelain crucible, 1.00 g of the molybdenum trioxide powder of Example 6 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 97%, and the reaction with sulfur proceeded rapidly.

Example 7

0.88 kg of the molybdenum trioxide powder of Example 7 was collected from the collection device 4 in the same manner as in Example 1, except that 1 kg of molybdenum trioxide (manufactured by TAIYO KOKO Co., Ltd.) was charged into a sagger and calcined at a temperature of 1,100° C. for 10 hours without using a transition aluminum oxide (activated alumina manufactured by Wako Pure Chemical Industries, Ltd., average particle diameter: 45 μm) in Example 1.

The collected molybdenum trioxide powder of Example 7 had an average particle diameter of primary particles of 80 nm, and by X-ray fluorescence (XRF) measurement, it was found that the content ratio (purity) of molybdenum trioxide ($MoO_3$) was 100.0%.

Further, the molybdenum trioxide powder of Example 7 was subjected to crystal structure analysis by X-ray diffraction (XRD), and as a result, the peak attributed to the β crystal of $MoO_3$ and the peak attributed to the α crystal of $MoO_3$ were observed, and no other peaks were observed. Next, the peak intensity ratio (β (011)/α (021)) of the (011) plane of the β crystal to the (021) plane of the α crystal was determined, and β (011)/α (021) was 4.2.

In a porcelain crucible, 1.00 g of the molybdenum trioxide powder of Example 7 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 97%, and the reaction with sulfur proceeded rapidly.

Comparative Example 1

A molybdenum trioxide powder was produced in the same manner as in Example 1 except that the mixture of 1 kg of a transition aluminum oxide (activated alumina manufactured by Wako Pure Chemical Industries, Ltd., average particle diameter: 45 μm) and 1 kg of molybdenum trioxide (manufactured by TAIYO KOKO Co., Ltd.) in Example 1 was changed to a mixture of 4.0 kg of a transition aluminum oxide (activated alumina manufactured by Wako Pure Chemical Industries, Ltd., average particle diameter: 45 μm) and 1.0 kg of molybdenum trioxide (manufactured by TAIYO KOKO Co., Ltd.).

After calcining, 1.0 kg of aluminum oxide, a blue powder, and 0.80 kg of the molybdenum trioxide powder collected by the collection device 4 were taken out from the sagger. The collected molybdenum trioxide powder of Comparative Example 1 had an average particle diameter of primary particles of 100 nm, and by X-ray fluorescence (XRF) measurement, the content ratio (purity) of molybdenum trioxide ($MoO_3$) was 99.3%.

Further, the molybdenum trioxide powder of Comparative Example 1 was subjected to crystal structure analysis by X-ray diffraction (XRD), and as a result, the peak attributed to the β crystal of $MoO_3$ and the peak attributed to the α crystal of $MoO_3$ were observed. Next, the peak intensity ratio (β (011)/α (021)) of the (011) plane of the (3 crystal to the (021) plane of the α crystal was determined, and β (011)/α (021) was 2.7.

In a porcelain crucible, 1.00 g of the molybdenum trioxide powder of Comparative Example 1 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 96%, and the reaction with sulfur proceeded rapidly.

Comparative Example 2

A molybdenum trioxide powder was produced in the same manner as in Example 1 except that the mixture of 1 kg of a transition aluminum oxide (activated alumina manufactured by Wako Pure Chemical Industries, Ltd., average particle diameter: 45 μm) and 1 kg of molybdenum trioxide (manufactured by TAIYO KOKO Co., Ltd.) in Example 1 was changed to a mixture of 3.0 kg of a transition aluminum oxide (activated alumina manufactured by Wako Pure Chemical Industries, Ltd., average particle diameter: 45 μm) and 1.0 kg of molybdenum trioxide (manufactured by TAIYO KOKO Co., Ltd.).

After calcining, 1.0 kg of aluminum oxide, a blue powder, and 0.85 kg of the molybdenum trioxide powder collected by the collection device 4 were taken out from the sagger. The collected molybdenum trioxide powder of Comparative Example 2 had an average particle diameter of primary particles of 120 nm, and by X-ray fluorescence (XRF) measurement, the content ratio (purity) of molybdenum trioxide ($MoO_3$) was 99.5%.

Further, the molybdenum trioxide powder of Comparative Example 2 was subjected to crystal structure analysis by X-ray diffraction (XRD), and as a result, the peak attributed to the β crystal of $MoO_3$ and the peak attributed to the α crystal of $MoO_3$ were observed, and no other peaks were observed. Next, the peak intensity ratio (β (011)/α (021)) of the (011) plane of the β crystal to the (021) plane of the α crystal was determined, and (011)/α (021) was 5.0.

In a porcelain crucible, 1.00 g of the molybdenum trioxide powder of Comparative Example 2 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), it was found that the conversion rate to $MoS_2$ was 98%, and the reaction with sulfur proceeded rapidly.

Comparative Example 3

1 g of the molybdenum trioxide powder of Example 1 was charged into a crucible and calcined again at 350° C. for 4 hours to obtain a molybdenum trioxide powder of Comparative Example 3.

The molybdenum trioxide powder of Comparative Example 3 had an average particle diameter of primary particles of 140 nm, and by X-ray fluorescence (XRF) measurement, it was found that the content ratio (purity) of molybdenum trioxide ($MoO_3$) was 99.6%.

Further, the molybdenum trioxide powder of Comparative Example 3 was subjected to crystal structure analysis by X-ray diffraction (XRD), and as a result, the peak attributed to the α crystal of $MoO_3$ was observed, and no other peaks were observed. The peak intensity ratio (β (011)/α (021)) of the (011) plane of the β crystal to the (021) plane of the α crystal was 0.

In a porcelain crucible, 1.00 g of the molybdenum trioxide powder of Comparative Example 3 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), the conversion rate to $MoS_2$ was 25%, and the reactivity with sulfur was poor.

Comparative Example 4

1 g of the molybdenum trioxide powder of Example 1 was charged into a crucible and calcined again at 400° C. for 4 hours to obtain a molybdenum trioxide powder of Comparative Example 4.

The molybdenum trioxide powder of Comparative Example 4 had an average particle diameter of primary particles of 150 nm, and by X-ray fluorescence (XRF) measurement, it was found that the content ratio (purity) of molybdenum trioxide ($MoO_3$) was 99.7%.

Further, the molybdenum trioxide powder of Comparative Example 4 was subjected to crystal structure analysis by X-ray diffraction (XRD), and as a result, the peak attributed to the α crystal of $MoO_3$ was observed, and no other peaks were observed. The peak intensity ratio (β (011)/α (021)) of the (011) plane of the β crystal to the (021) plane of the α crystal was 0.

In a porcelain crucible, 1.00 g of the molybdenum trioxide powder of Comparative Example 4 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), the conversion rate to $MoS_2$ was 20%, and the reactivity with sulfur was poor.

Comparative Example 5

Figure 3:
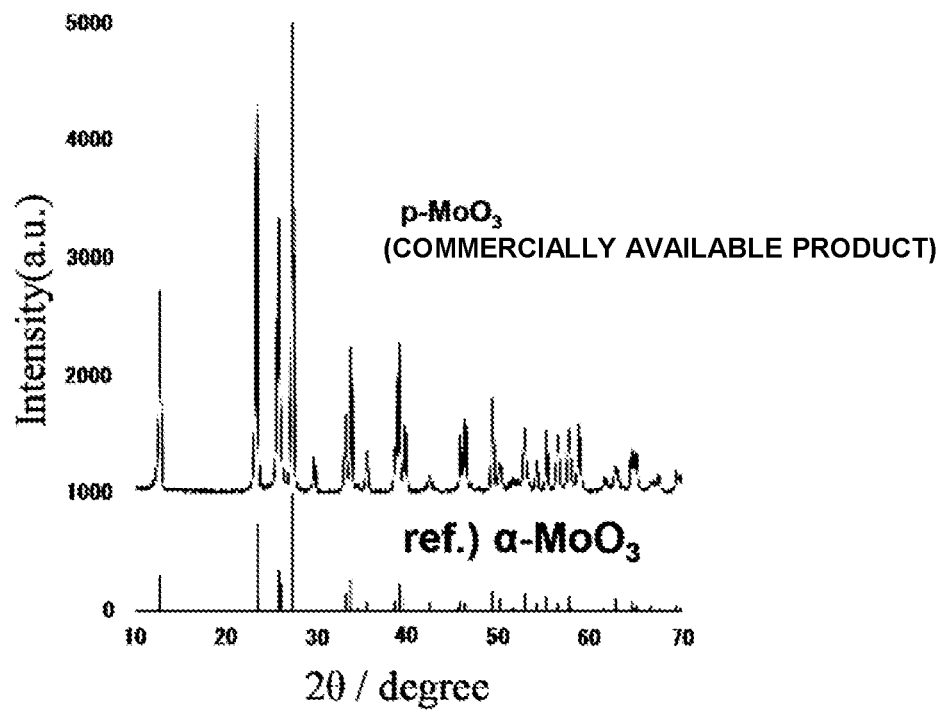
FIG. 3 shows a result of an X-ray diffraction (XRD) pattern of a commercially available molybdenum trioxide powder together with the standard pattern (α-$MoO_3$) of the α crystal of molybdenum trioxide.

As Comparative Example 5, X-ray diffraction (XRD) of a commercially available molybdenum trioxide powder (manufactured by Aldrich) was measured. The result of the X-ray diffraction pattern is shown in FIG. 3 together with the standard pattern (α-$MoO_3$) of the α crystal of molybdenum trioxide. As a result of crystal structure analysis, the peak attributed to the α crystal of $MoO_3$ was observed, and no other peaks were observed. The peak intensity ratio (β (011)/α (021)) of the (011) plane of the β crystal to the (021) plane of the α crystal was 0.

In a porcelain crucible, 1.00 g of the molybdenum trioxide powder of Comparative Example 5 and 1.57 g of a sulfur powder (manufactured by Kanto Chemical Co., Inc.) were mixed with each other with a stirring rod such that the powder was uniform, and the mixture was calcined in a nitrogen atmosphere at 320° C. for 4 hours to obtain a black powder. As a result of crystal structure analysis of the black powder by X-ray diffraction (XRD), the conversion rate to $MoS_2$ was 5%, and the reactivity with sulfur was poor.

The results of Examples and Comparative Examples are summarized and shown in Table 1.

Since the molybdenum trioxide powders of Examples 1 to 7 each contain an aggregate of primary particles having an average particle diameter of 1 μm or less and having a β crystal structure of molybdenum trioxide, the molybdenum trioxide powders have better reactivity with sulfur than the molybdenum trioxide powders of Comparative Examples 3 to 5 having only an α crystal as the crystal structure. Further, since the molybdenum trioxide powders of Examples 1 to 7 have a $MoO_3$ content ratio of 99.6% or more measured by X-ray fluorescence (XRF), when each of the molybdenum trioxide powders is subjected to sulfurization reaction, it is possible to obtain molybdenum sulfide having high purity and good storage stability, which is not likely to generate a sulfide derived from impurities. Therefore, the molybdenum trioxide powder according to the present embodiment can be suitably used as a precursor of molybdenum sulfide.

TABLE 1

|  | β crystal | α crystal | β (011)/ α (021) | SA/m²·g⁻¹ | EXAFS ratio (I/II) | XRF MoO₃ content | Result Reactivity with S*¹ | Purity*² |
|---|---|---|---|---|---|---|---|---|
| Example 1 | Present | Present | 5.2 | 44.0 | 2.0 | 99.7% | A | A |
| Example 2 | Present | Present | 4.4 | 33.2 | 1.8 | 99.8% | A | A |
| Example 3 | Present | Present | 6.2 | 40.9 | 2.2 | 99.6% | A | A |
| Example 4 | Present | Present | 2.0 | 45.1 | 1.2 | 99.7% | A | A |
| Example 5 | Present | Present | 1.7 | 33.7 | 1.5 | 99.7% | A | A |
| Example 6 | Present | Present | 4.5 | 39.9 | 1.8 | 99.9% | A | A |
| Example 7 | Present | Present | 4.2 | 45.3 | 1.7 | 99.9%< | A | A |
| Comparative Example 1 | Present | Present | 2.7 | 31.2 | 1.0 | 99.3% | A | B |
| Comparative Example 2 | Present | Present | 5.0 | 41.8 | 1.9 | 99.5% | A | B |
| Comparative Example 3 | N.D. | 99%< | 0 | 29.8 | 0.9 | 99.6% | B | A |
| Comparative Example 4 | N.D. | 99%< | 0 | 25.0 | 0.9 | 99.7% | B | A |
| Comparative Example 5 | N.D. | 99%< | 0 | 4.2 | 0.9 | 99.9% | B | A |

*¹A: S/Mo = 7, conversion rate to $MoS_2$ after calcining at 320° C. for 4 hours is 95% or more
B: S/Mo = 7, conversion rate to $MoS_2$ after calcining at 320° C. for 4 hours is less than 95%
*²A: purity of collected $MoO_3$ is 99.6% or more
B: purity of collected $MoO_3$ is less than 99.6%

The invention claimed is:

1. A molybdenum trioxide powder comprising:
an aggregate of primary particles having a β crystal structure of molybdenum trioxide, wherein
the molybdenum trioxide powder has a $MoO_3$ content ratio of 99.6% or more measured by X-ray fluorescence (XRF), an average particle diameter of the primary particles of 1 µm or less, and a specific surface area of 30 m²/g to 100 m²/g measured by a BET method,
in a radial distribution function obtained from an extended X-ray absorption fine structure (EXAFS) spectrum of a K absorption edge of molybdenum, a ratio (I/II) of intensity I of a peak caused by Mo—O to intensity II of a peak caused by Mo—Mo is more than 1.1.

2. The molybdenum trioxide powder according to claim 1, wherein
in a spectrum obtained from powder X-ray diffraction (XRD) using Cu-Kα rays as an X-ray source, a ratio (β (011)/α (021)) of intensity of a peak attributed to a (011) plane of a β crystal of $MoO_3$ to intensity of a peak attributed to a (021) plane of an α crystal of $MoO_3$ is 0.1 or more.

3. The molybdenum trioxide powder according to claim 2, wherein
in the spectrum obtained from the powder X-ray diffraction (XRD) using the Cu-Kα rays as the X-ray source, the ratio (β (011)/α (021)) of the intensity of the peak attributed to the (011) plane of the β crystal of $MoO_3$ to the intensity of the peak attributed to the (021) plane of the α crystal of $MoO_3$ is 0.4 to 10.0.

4. A method for producing the molybdenum trioxide powder according to claim 1, comprising:
vaporizing a molybdenum oxide precursor compound to form molybdenum trioxide vapor; and
cooling the molybdenum trioxide vapor.

5. The method for producing the molybdenum trioxide powder according to claim 4, wherein
a raw material mixture containing the molybdenum oxide precursor compound and a metal compound other than the molybdenum oxide precursor compound is calcined to vaporize the molybdenum oxide precursor compound so as to form molybdenum trioxide vapor, and
a ratio of the metal compound to 100% by mass of the raw material mixture is 70% by mass or less in terms of oxide.

6. The method for producing the molybdenum trioxide powder according to claim 4, wherein
the molybdenum trioxide vapor is cooled in an air atmosphere.

7. The method for producing the molybdenum trioxide powder according to claim 4, wherein
a powder obtained by cooling the molybdenum trioxide vapor is calcined again at a temperature of 100° C. to 320° C.

8. The molybdenum trioxide powder according to claim 1, wherein in a spectrum obtained from powder X-ray diffraction (XRD) using Cu-Kα rays as an X-ray source, a ratio (β (011)/α (021)) of intensity of a peak attributed to a (011) plane of a β crystal of $MoO_3$ to intensity of a peak attributed to a (021) plane of an α crystal of $MoO_3$ is 0.1 to 6.2.

* * * * *